United States Patent [19]

Grigoriev et al.

[11] Patent Number: 5,527,452
[45] Date of Patent: Jun. 18, 1996

[54] DEVICE FOR PROVIDING TRIBOCHEMICAL MODE OF OPERATION IN A LUBRICATION SYSTEM FOR A MECHANISM

[75] Inventors: Boris P. Grigoriev, deceased, late of St. Petersburg, by Antonina I. Zubkova, Olga B. Grigorieva, and Elana B. Usoltseva, legal representatives; Dmitry N. Glebovsky, St. Petersburg; Anatoly I. Belotserkovets, St. Petersburg; Mikhail E. Judovich, St. Petersburg; Elena A. Busko, St. Petersburg, all of Russian Federation

[73] Assignee: Metzhotraslevoe Nauchno-Proizvodstvennoe Obedinenie Ekologiya, St. Petersburg, Russian Federation

[21] Appl. No.: 199,329

[22] PCT Filed: Jun. 29, 1993

[86] PCT No.: PCT/RU93/00141

§ 371 Date: Jul. 29, 1994

§ 102(e) Date: Jul. 29, 1994

[87] PCT Pub. No.: WO94/00677

PCT Pub. Date: Jan. 6, 1994

[30] Foreign Application Priority Data

Jun. 30, 1992 [RU] Russian Federation ........ 50630019/06

[51] Int. Cl.⁶ .................................................. B01D 35/02
[52] U.S. Cl. .......................... 210/130; 210/136; 210/203; 210/206; 210/315; 210/316; 210/440; 210/441; 210/458; 210/497.3; 210/501; 210/487; 210/489

[58] Field of Search ........................... 210/203, 206, 210/209, 315, 316, 317, 440, 442, 457, 458, 501, 130, 136, 497.3, 487, 489

[56] References Cited

U.S. PATENT DOCUMENTS

| | | |
|---|---|---|
| 3,005,555 | 10/1961 | Bosworth. |
| 3,289,847 | 12/1966 | Rothemund ............................. 210/440 |
| 3,749,247 | 7/1973 | Rhode. |
| 4,751,901 | 6/1988 | Moor. |

FOREIGN PATENT DOCUMENTS

| | | |
|---|---|---|
| 2473622 | 7/1981 | France. |
| 1343045 | 10/1987 | Russian Federation. |
| 1507995 | 9/1989 | Russian Federation. |
| 1541051 | 2/1979 | United Kingdom. |

*Primary Examiner*—Matthew O. Savage
*Attorney, Agent, or Firm*—Merchant, Gould, Smith, Edell, Welter & Schmidt

[57] ABSTRACT

A device providing for tribochemical regime in the lubrication system of a mechanism comprises a casing (1), a cover (2) with inlet openings (3) and an outlet sleeve (4) for the inlet and outlet of the oil, a non-return valve (5), a relief valve (6), a standard hollow full-flow filtering element (7), a tribochemical package consisting of coaxial perforated shells (8 and 9) enveloped in a filtering material (11), granulated alkaline reagent (12) placed between the shell (9) and the filtering element (7), as well as iodine with which is impregnated the filtering material (11) of the shell (8). The shells (8 and 9) consist of truncated cones with oppositely oriented bases. Their larger and smaller bases, respectively, are secured with tension on the casing of the relief valve (6), the larger base of the shell (9) is secured with tension on the outlet sleeve (4) and inside it is secured, at interference fit, a smaller base of the shell (8).

4 Claims, 2 Drawing Sheets

DEVICE FOR PROVIDING TRIBOCHEMICAL MODE OF OPERATION IN A LUBRICATION SYSTEM FOR A MECHANISM

FIELD OF THE INVENTION

The present invention is in the field of machine building, relating more specifically to circulating lubrication systems for use with mechanisms and engines, more especially internal combustion engines.

BACKGROUND OF THE INVENTION

Devices have been developed to stabilize the oil properties and extend the useful life of pair of surfaces in friction in mechanisms, wherein a prolonged-effect alkaline reagent and iodine are used to provide a special tribochemical mode of operation. The provision of such a mode in a lubrication system used with a mechanism may extend the useful life of motor oil 3 to 8 times while also extending the service life of a mechanism between repairs by 1.5 to 3 times. Devices of this type have been realized in practice and are utilized by preference in diesel engines of various designations, which have an external oil supply line. The problem with using the technology under consideration in carburettor engines which have no such line, lies in the need for developing an appropriate device that would not require the lubrication system to be modified.

There is known a device providing a tribochemical mode of operation in a lubrication system usable with a mechanism (SU, Al, No. 1 343 045), which comprises a casing, a cover with inlet holes and an outlet nozzle for oil inflow and outflow, a relief valve, a tribochemical package, and an indicator to show the extent of fouling within the device. The tribochemical package consists of two covers, with three cylindrical shells, perforated for oil passage, installed therebetween. The smaller- and middle-diameter shells are enveloped in filtering material. Granulated alkaline reagent is placed between the larger- and middle-diameter shells. The filtering material of the smaller-diameter shell is impregnated with iodine. The fouling indicator is linked mechanically with the relief valve to indicate when this is opened.

With the device in operation, the oil from the peripheral zone of the casing passes through the perforations of the larger-diameter shell on to the alkaline reagent to partially dissolve it. As a result, some of oil properties ace improved and stabilized. Further on, the oil arrives at the filtering material of the middle-diameter shell, where it is cleaned of mechanical impurities, including fine particles of alkaline reagent. Next, the oil feeds on to the filtering material of the smaller-diameter shell to contact the iodine contained therein. This results in further improvement of the oil properties and in the formation of friction modifiers.

Thus, the device in question assures the provision of a tribochemical mode of operation in the lubrication system of a running mechanism and is capable of maintaining it for a long time, based on the amount of chemical reagents contained therein. However the filtering material surface area of the shells is too small in this device, and this leads to the device being fouled after a short time and to increasing resistance to the oil flow. The result is that the relief valve opens and uncleaned oil flows into the mechanism directly, by-passing the tribochemical passage, which calls, in its own turn, for continuously monitoring the fouling indicator. In summing up, the device has a short continuous-service life and requires frequent cleanings.

A better version is a device to provide a tribochemical mode of operation in a lubrication system usable with a mechanism (SU, Al, No. 1 507 995), comprising a casing, a cover with inlet holes and an outlet nozzle for oil inflow and outflow, a relief valve, a tribochemical package, and an indicator to show the extent of fouling in the device. The tribochemical package consists of two covers, with three cylindrical shells, perforated for oil passage, installed therebetween. The smaller- and middle-diameter shells are enveloped in filtering material. Granulated alkaline reagent is placed between the larger- and middle-diameter shells. The filtering material of the smaller-diameter shell is impregnated with iodine. The fouling indicator is linked mechanically with the relief valve to indicate when this is opened. Apart from the aforesaid elements, the device contains a full-flow filtering element mounted on the larger-diameter shell.

The operation of this device is largely similar to that or the device described hereintofore. The only difference is that the oil from the peripheral part of the casing first feeds on to the filtering element and is already cleaned of mechanical impurities when it arrives at the tribochemical package.

This device eliminates, in part, the disadvantages as described hereinbefore. However it is specific in that the tribochemical package takes up a large part of the space within the casing so that little space is left for accomodation of the filtering element. For this reason. It has a small filtering surface area, hence, a small dirt absorbance capacity —considerably smaller compared to standard oil filtering elements. Thus, monitoring the extent of fouling with the aid of an indicator remains a requirement in the operation of this device too. The continuous-service lives of the tribochemical package and the filtering element are vastly different. Standard filtering elements being unsuitable for use in the device makes its manufacture a rather involved process.

SUMMARY OF THE INVENTION

The invention is based upon the objective of providing a design for a device to provide a tribochemical mode of operation in a lubrication system usable with a mechanism, wherein the tribochemical package would be so designed as to enable accomodation of a standard oil filtering element in the device and thus facilitate the manufacture and operation of the device.

The objective as stated above is achieved by providing a device to provide a tribochemical mode of operation in a lubrication system for a mechanism, comprising a casing, a cover with inlet holes and an outlet nozzle for oil inflow and outflow. A relief valve, a hollow full-flow oil filtering element, a tribochemical package composed of coaxial perforated shells enveloped in a filtering material, granulated alkaline reagent placed between the outer shell and the full-flow filtering element, and iodine used to impregnate the filtering material of the inner shell, wherein, in accordance with the invention, the shells are in the form of frusta of cones having their respective bases oppositely arranged and joined in a hermetic manner with the outlet nozzle and the relief valve.

A tribochemical package so described takes up as little space as possible in the device, enabling the use of standard filtering elements, while the allowable quantity of chemical reagents that can be accomodated within the package is capable of maintaining a tribochemical mode of operation for a period of time comparable with the continuous service time of the standard filtering element. As a result, there is no longer any need for using a fouling indicator, the process involved in manufacturing the device and operation thereof being essentially facilitated. Besides, apart from providing a tribochemical mode of operation as its main function, the inventive device is capable of simultaneously performing the function of a standard oil filter, all aspects considered.

It is convenient for the total area of the perforations in each of the conical shells to be at least 5 times greater than the bore area of the outlet nozzle.

This arrangement will eliminate the possibility of any additional oil flow resistance to be produced by the shells.

It is likewise convenient for the larger and smaller bases of the inner and outer shells, respectively, to be interference fitted over the casing of the relief valve and for the larger base of the outer shell to be interference fitted over the outlet nozzle, with the smaller base of the inner shell to be push fitted thereinside.

This arrangement is most simple and reliable, warranting, among other things, hermetic sealing between the shells and the nozzle/relief valve in case the spring load on the filtering element is slackened.

In the following, the invention is made more fully apparent through a detailed description of the best mode of carrying the invention into effect, with due references to the accompanying drawings.

DETAILED DESCRIPTION OF THE PREFERRED EMBODIMENT

Figure 1:
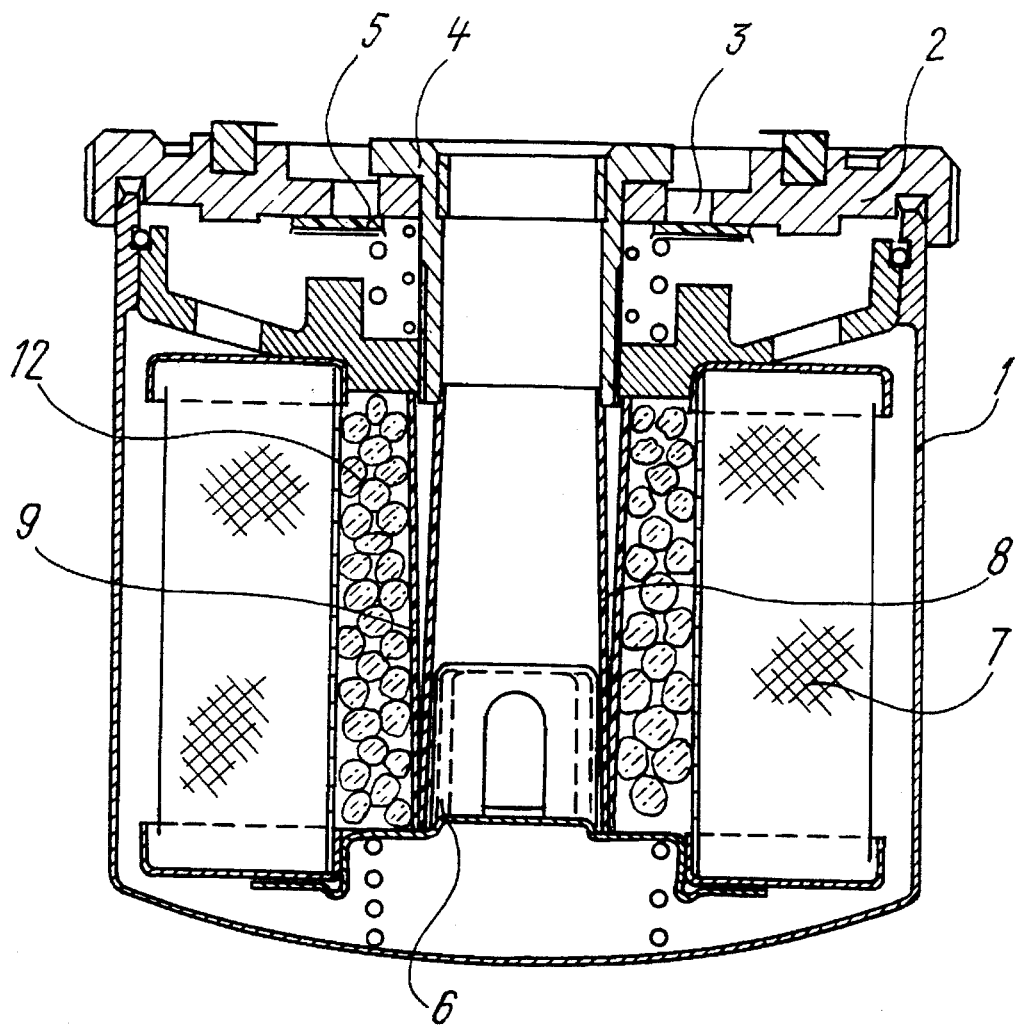
FIG. 1 is a schematic illustration of the device according to the invention, designed to provide a tribochemical mode of operation in a lubrication system for a mechanism, in longitudinal section.
Figure 2:
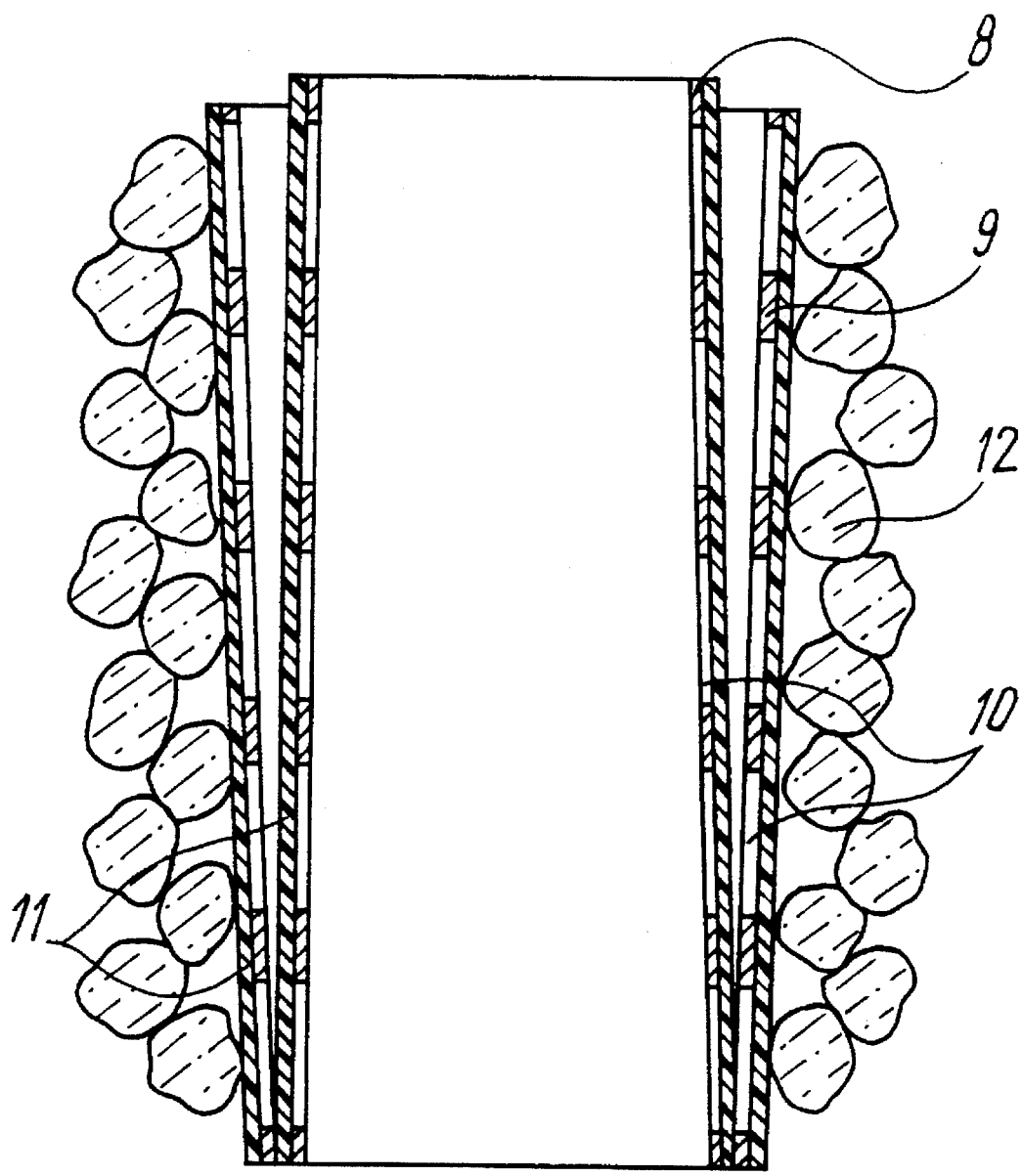
FIG. 2 is a fragment of the tribochemical package, an enlarged-scale view.

The device to provide a tribochemical mode of operation comprises a casing 1 (FIG. 1), a cover 2 with inlet holes 3 and an outlet nozzle 4 for oil inflow and outflow, a non-return valve 5, a relief valve 6, and a standard hollow full-flow oil filtering element 7. Arranged within the inner space of the filtering element 7 are coaxial inner and outer shells 8 and 9, respectively. The shells 8 and 9 are in the form of frusta of cones, with the respective bases in opposite arrangement. The inner shell 8 has its larger base interference fitted over the casing of the relief valve 6 while its smaller case is push fitted inside the outlet nozzle 4. The outer shell 9 has its larger base interference fitted over the outlet nozzle 4 while its smaller base is interference fitted, via the larger base of the inner shell 8, over the casing of the relief valve 6. The shells 8 and 9 (FIG. 2) are perforated, the perforations 10 being intended for oil passage. The total area of the perforations 10 in each of the shells 8 and 9 is at least 5 times greater than the bore area of the outlet nozzle 4, which precludes the possibility of any additional resistance to oil flow being produced thereby. The shells 8 and 9 are enveloped in a cotton or nonwoven synthetic filtering material 11. Placed between the outer shell 9 (FIG. 1) and the filtering element 7 is a granulated alkaline reagent 12, a fusion product of sodium hydroxide and tin oxide. The filtering material 11 of the inner shell 8 is impregnated with iodine. The conical shells 8 and 9 enveloped in filtering material 11, taken in conjunction with iodine and fused sodium hydroxide-tin oxide product as chemical reagents, compose a tribochemical package. The tribochemical package so realized takes up as little space as possible within the casing 1 of the inventive device. This is exactly what makes it possible to use standard full-flow filtering elements in the inventive device. The amount of reagents that can be placed within the tribochemical package is capable of maintaining a tribochemical mode of operation for a period of time comparable with the continuous-service time of a standard filtering element.

The device operates as follows.

As the engine is started up, the oil is supplied from the crankcase via the inlet holes 3 and the non-return valve 5 into the space between the casing 1 and the oil filtering element 7. Then the oil passes through the filtering element 7 where it is cleaned of mechanical impurities. The cleaned oil feeds into the space containing the alkaline reagent 12 within the tribochemical package. As the oil reacts with the alkaline reagent 12, the latter is partially dissolved, the oil-contained carboxylic acids are neutralized, and the acid number increases. Fine particles of the reagent 12 are retained on the filtering material 11 of the shell 9. Further on, the oil feeds through the perforations 10 on to the filtering material 11 of the shell 8 to partially dissolve a quantity of iodine. Now the filtered and heated oil enriched with dissolved additives will give rise to and maintain tribochemical conditions leading to the reduction of acidified lubricant forms and to the formation of friction modifiers. On passing through the perforations 10 of the shell 8, the oil feeds through the outlet nozzle 4 into the cylinder block of the engine where, owing to the presence of friction modifiers, a metal plating film is formed on the friction-affected surfaces. This affords compensation for the wear of pairs of surfaces in friction and improvement of their corrosion resistance, as well as reduced coefficient of friction. The result being a noticeable increase in engine service life. The use of a standard filtering element assures comparable running hours before the tribochemical package and the filtering element have to be replaced. Thus, along with the provision of a tribochemical mode of operation, the inventive device warrants effective oil cleaning and other functions that a standard oil filter is expected to perform.

INDUSTRIAL APPLICABILITY

The proposed device to provide tribochemical mode of operation can be used in mechanisms with circulating systems of lubrication, having loaded pairs of surfaces in friction or combustion chambers, thus in large-sized presses, compressors, or internal combustion engines. Considering the specific design features of said mechanisms, the proposed device can be used to best advantage in carburettor engines. The device is easy to manufacture, convenient to operate, and reliable. One other important point is that the use of this device will not require the lubrication system to be modified.

We claim:

1. A device for providing a tribochemical mode of operation in an oil system of a mechanism, comprising:

a casing;

a cover covering a top side of the casing, the cover having a plurality of inlet holes disposed away from a center of the cover and an outlet nozzle proximate the center of the cover for oil inflow and outflow;

a non-return valve being disposed in the casing to receive oil from the inlet holes, the non-return valve being proximate the inlet holes of the cover;

a relief valve being disposed proximate a bottom side of the casing;

a hollow full-flow filtering element being disposed between the top side and the bottom side of the casing to receive oil from the non-return valve;

a tribochemical package composed of coaxial first and second perforated shells enveloped in a filtering material, the first and second perforated shells being disposed within the hollow full-flow filtering element, the first perforated shell being disposed inside of the second perforated shell;

a granulated alkaline reagent placed between the second perforated shell and the hollow full-flow filtering element;

iodine impregnating the filtering material of the first perforated shell; and wherein each of the first and second perforated shells is in a form of a frusta of cone having respective larger and smaller bases, the smaller base of the first perforated shell and the larger base of the second perforated shell being attached to the outlet nozzle, and the larger base of the first perforated shell and the smaller base of the second perforated shell being attached to the relief valve.

2. A device as defined in claim 1, wherein a total area of perforations in each of the first and second perforated shells is at least 5 times greater than a bore area of the outlet nozzle.

3. A device as defined in claim 2, wherein the larger base of the first perforated shell is interference fitted over the relief valve while the smaller base of the first perforated shell is interference fitted inside the outlet nozzle, and the larger base of the second perforated shell is interference fitted over the outlet nozzle while the smaller base of the second perforated shell is interference fitted over the relief valve via the larger base of the first perforated shell.

4. A device as defined in claim 1, wherein the larger base of the first perforated shell is interference fitted over the relief valve while the smaller base of the first perforated shell is interference fitted inside the outlet nozzle, and the larger base of the second perforated shell is interference fitted over the outlet nozzle while the smaller base of the second perforated shell is interference fitted over the relief valve via the larger base of the first perforated shell.

* * * * *